United States Patent
Xu et al.

(10) Patent No.: US 10,891,553 B2
(45) Date of Patent: Jan. 12, 2021

(54) METHOD AND APPARATUS FOR RECOMMENDING MESSAGE

(71) Applicant: Huawei Technologies Co., Ltd., Shenzhen (CN)

(72) Inventors: Jun Xu, Shenzhen (CN); Hang Li, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 692 days.

(21) Appl. No.: 15/295,755

(22) Filed: Oct. 17, 2016

(65) Prior Publication Data

US 2017/0032271 A1    Feb. 2, 2017

Related U.S. Application Data

(63) Continuation of application No. PCT/CN2015/076365, filed on Apr. 10, 2015.

(30) Foreign Application Priority Data

Apr. 17, 2014 (CN) .......................... 2014 1 0155869

(51) Int. Cl.
    *G06N 7/00* (2006.01)
    *G06F 16/2457* (2019.01)
    (Continued)

(52) U.S. Cl.
    CPC ....... *G06N 7/005* (2013.01); *G06F 16/24578* (2019.01); *G06F 16/335* (2019.01);
    (Continued)

(58) Field of Classification Search
    CPC ................ G06N 7/005; G06F 16/9535; G06F 16/24578; G06F 16/335; G06Q 10/10;
    (Continued)

(56) References Cited

U.S. PATENT DOCUMENTS

| 7,933,856 B2 | 4/2011 | Verspoor et al. |
| 2010/0030772 A1 | 2/2010 | Zilca et al. |

(Continued)

FOREIGN PATENT DOCUMENTS

| CN | 102004774 A | 4/2011 |
| CN | 102227120 A | 10/2011 |

(Continued)

OTHER PUBLICATIONS

Sarwaretal., "Item-Based Collaborative Filtering Recommendation Algorithms", GroupLens Research Group/Army HPC Research Center Department of Computer Science and Engineering University of Minnesota, Minneapolis, pp. 285-295 (Year: 2001).*

(Continued)

*Primary Examiner* — Li B. Zhen
*Assistant Examiner* — Henry Nguyen
(74) *Attorney, Agent, or Firm* — Conley Rose, P.C.

(57) ABSTRACT

A method and an apparatus for recommending a message. The method for recommending a message in the present disclosure includes separately parsing a first message published by a first user on a network and a second message published by a second user on the network, obtaining interest description information of the first message and topic description information of the second message, where the second user is another user except the first user, comparing the topic description information with the interest description information, and calculating a similarity of the topic description information and the interest description information; and if the similarity is greater than or equal to a predetermined value, pushing the second message published by the second user to the first user. A user can conveniently and flexibly obtain a message in which the user is interested in the embodiments of the present disclosure.

20 Claims, 2 Drawing Sheets

(51) Int. Cl.
*H04L 29/08* (2006.01)
*G06Q 50/00* (2012.01)
*G06Q 10/10* (2012.01)
*H04L 12/58* (2006.01)
*G06F 16/9535* (2019.01)
*G06F 16/335* (2019.01)
*G06N 20/00* (2019.01)

(52) U.S. Cl.
CPC ......... *G06F 16/9535* (2019.01); *G06N 20/00* (2019.01); *G06Q 10/10* (2013.01); *G06Q 50/01* (2013.01); *H04L 51/12* (2013.01); *H04L 51/14* (2013.01); *H04L 51/32* (2013.01); *H04L 67/26* (2013.01)

(58) Field of Classification Search
CPC ......... G06Q 50/01; H04L 51/12; H04L 51/14; H04L 51/32; H04L 67/26
See application file for complete search history.

(56) References Cited

U.S. PATENT DOCUMENTS

| | | | |
|---|---|---|---|
| 2010/0153324 A1* | 6/2010 | Downs | G06F 40/42 706/21 |
| 2011/0218948 A1 | 9/2011 | De Souza et al. | |
| 2011/0302097 A1 | 12/2011 | Lonkar et al. | |
| 2012/0030287 A1 | 2/2012 | Leonard | |
| 2012/0226651 A1 | 9/2012 | Chidlovskii et al. | |
| 2012/0278740 A1 | 11/2012 | Robinson et al. | |
| 2013/0159236 A1* | 6/2013 | Vladislav | G06F 40/30 706/46 |
| 2013/0159254 A1* | 6/2013 | Chen | G06F 16/9535 707/639 |
| 2015/0066904 A1* | 3/2015 | Asur | G06F 16/951 707/722 |

FOREIGN PATENT DOCUMENTS

| | | |
|---|---|---|
| CN | 102332006 A | 1/2012 |
| CN | 102938807 A | 2/2013 |
| CN | 103106285 A | 5/2013 |
| CN | 103577579 A | 2/2014 |

OTHER PUBLICATIONS

Sarwar, Badrul, et al. "Item-based collaborative filtering recommendation algorithms." Proceedings of the 10th international conference on World Wide Web. 2001. (Year: 2001).*
Foreign Communication From A Counterpart Application, PCT Application No. PCT/CN2015/076365, English Translation of International Search Report dated Jul. 15, 2015, 2 pages.
Foreign Communication From A Counterpart Application, PCT Application No. PCT/CN2015/076365, English Translation of Written Opinion dated Jul. 15, 2015, 6 pages.
Machine Translation and Abstract of Chinese Publication No. CN102004774, Apr. 6, 2011, 26 pages.
Machine Translation and Abstract of Chinese Publication No. CN102332006, Jan. 25, 2012, 31 pages.
Machine Translation and Abstract of Chinese Publication No. CN103577579, Feb. 12, 2014, 25 pages.

* cited by examiner

METHOD AND APPARATUS FOR RECOMMENDING MESSAGE

CROSS-REFERENCE TO RELATED APPLICATIONS

This application is a continuation of International Application No. PCT/CN2015/076365, filed on Apr. 10, 2015, which claims priority to Chinese Patent Application No. 201410155869.3, filed on Apr. 17, 2014. The disclosures of the aforementioned applications are hereby incorporated by reference in their entireties.

TECHNICAL FIELD

Embodiments of the present disclosure relate to Internet technologies, and in particular, to a method and an apparatus for recommending a message.

BACKGROUND

Social media in the Internet, for example, microblog and TWITTER, is popular with a wide range of users. A user may conveniently obtain various messages sent by persons followed by the user, greatly satisfying a requirement of the user for obtaining information.

In the prior art, the social media pushes a message mainly by sending the message based on a circle of the user (for example, the persons followed by the user). Generally, a message in a circle that is not followed by the user cannot be obtained by the user.

In messages obtained by the user from the circle followed by the user, there are a lot of messages in which the user is not interested, wasting time and energy of the user. However, in messages from a circle that is not followed by the user, there are a lot of messages in which the user is interested, but the user cannot obtain these messages. Therefore, a manner in which the social media pushes a message to a user in the prior art lacks flexibility.

SUMMARY

Embodiments of the present disclosure provide a method and an apparatus for recommending a message, so that a user can conveniently and flexibly obtain a message in which the user is interested.

According to a first aspect, an embodiment of the present disclosure provides a method for recommending a message, including separately parsing a first message published by a first user on a network and a second message published by a second user on the network, and obtaining interest description information of the first message and topic description information of the second message, where the second user is another user except the first user; comparing the topic description information with the interest description information, and calculating a similarity of the topic description information and the interest description information; and pushing, if the similarity is greater than or equal to a predetermined value, the second message published by the second user to the first user.

With reference to the first aspect, in a first possible implementation manner of the first aspect, the interest description information includes probability distribution information of the first message published by the first user on K topics, and the topic description information includes probability distribution information of the second message published by the second user on the K topics, where K is an integer that is greater than 0; and correspondingly, the comparing the topic description information with the interest description information, and calculating a similarity of the topic description information and the interest description information includes comparing the probability distribution information of the second message on the K topics with the probability distribution information of the first message on the K topics, and calculating a similarity of the probability distribution information of the second message on the K topics and the probability distribution information of the first message on the K topics.

With reference to the first possible implementation manner of the first aspect, in a second possible implementation manner of the first aspect, the separately parsing a first message published by a first user on a network and a second message published by a second user on the network, and obtaining interest description information of the first message and topic description information of the second message specifically includes separately parsing the first message published by the first user on the network and the second message published by the second user on the network, obtaining allocation information of each word in the first message and the second message on the K topics, and separately determining the interest description information of the first message and the topic description information of the second message according to the allocation information.

With reference to the second possible implementation manner of the first aspect, in a third possible implementation manner of the first aspect, the separately parsing the first message published by the first user on the network and the second message published by the second user on the network, obtaining allocation information of each word in the first message and the second message on the K topics, and separately determining the interest description information of the first message and the topic description information of the second message according to the allocation information includes randomly allocating each word in a message to any one of the K topics, and obtaining allocation information of each word in the message on the K topics after random allocation, where the message includes the first message or the second message; using a Gibbs sampling method, determining, starting from a first word in the message, according to a probability that the word belongs to another topic, whether the word needs to be reallocated to the another topic, further allocating, when a determining result is yes, the word to a topic to which the word needs to be allocated, until all words in the message are traversed, and updating allocation information of a word that needs to be reallocated in the message on the K topics after the traversal; repeating the traversal, until a quantity of repeating times reaches a first predetermined value, or stopping the traversal when a proportion occupied by a word that needs to be reallocated to a topic in all words in all messages published by a user that sends the message is less than a second predetermined value, and obtaining current allocation information of each word in the message on the K topics after the last traversal; and if the message is the first message, determining, according to current allocation information of each word in the first message on the K topics, the interest description information of the first message; or if the message is the second message, determining, according to current allocation information of each word in the second message on the K topics, the topic description information of the second message.

With reference to any one of the first to third possible implementation manners of the first aspect, in a fourth possible implementation manner of the first aspect, the comparing the probability distribution information of the second message on the K topics with the probability distribution information of the first message on the K topics, and calculating a similarity of the probability distribution information of the second message on the K topics and the probability distribution information of the first message on the K topics specifically includes using a cosine similarity algorithm:

$$s(u, d) = \frac{\sum_{i=1}^{K} p_i q_i}{\sqrt{\sum_{i=1}^{K} p_i^2} \sqrt{\sum_{i=1}^{K} q_i^2}},$$

where s(u, d) represents the similarity of the interest description information of the first message and the topic description information of the second message; u represents the interest description information of the first message; d represents the topic description information of the second message; $p_i$ represents an $i^{th}$ component of a vector u; and $q_i$ represents an $i^{th}$ component of a vector d.

With reference to any one of the first to third possible implementation manners of the first aspect, in a fifth possible implementation manner of the first aspect, the comparing the probability distribution information of the second message on the K topics with the probability distribution information of the first message on the K topics, and calculating a similarity of the probability distribution information of the second message on the K topics and the probability distribution information of the first message on the K topics specifically includes using a KL divergence algorithm:

$$KL(u, d) = \sum_{i=1}^{K} p_i \ln \frac{p_i}{q_i},$$

where KL(u, d) represents the similarity of the interest description information of the first message and the topic description information of the second message; u represents the interest description information of the first message; d represents the topic description information of the second message; $p_i$ represents an $i^{th}$ component of a vector u; and $q_i$ represents an $i^{th}$ component of a vector d.

According to a second aspect, an embodiment of the present disclosure provides an apparatus for recommending a message, including an obtaining module configured to separately parse a first message published by a first user on a network and a second message published by a second user on the network, and obtain interest description information of the first message and topic description information of the second message, where the second user is another user except the first user; a comparison module configured to compare the topic description information with the interest description information, and calculate a similarity of the topic description information and the interest description information; and a pushing module configured to push, if the similarity is greater than or equal to a predetermined value, a message published by the second user to the first user.

With reference to the second aspect, in a first possible implementation manner of the second aspect, the interest description information includes probability distribution information of the first message published by the first user on K topics, and the topic description information includes probability distribution information of the second message published by the second user on the K topics, where K is an integer that is greater than 0; and correspondingly, the comparison module is specifically configured to compare the probability distribution information of the second message on the K topics with the probability distribution information of the first message on the K topics, and calculate a similarity of the probability distribution information of the second message on the K topics and the probability distribution information of the first message on the K topics.

With reference to the first possible implementation manner of the second aspect, in a second possible implementation manner of the second aspect, the obtaining module is specifically configured to separately parse the first message published by the first user on the network and the second message published by the second user on the network, obtain allocation information of each word in the first message and the second message on the K topics, and separately determine the interest description information of the first message and the topic description information of the second message according to the allocation information.

With reference to the second possible implementation manner of the second aspect, in a third possible implementation manner of the second aspect, the obtaining module includes an allocation unit configured to randomly allocate each word in a message to any one of the K topics, and obtain allocation information of each word in the message on the K topics after random allocation, where the message includes the first message or the second message; a first determining unit configured to use a Gibbs sampling method, determine, starting from a first word in the message, according to a probability that the word belongs to another topic, whether the word needs to be reallocated to the another topic, further allocate, when a determining result is yes, the word to a topic to which the word needs to be allocated, until all words in the message are traversed, and update allocation information of a word that needs to be reallocated in the message on the K topics after the traversal, where the first determining unit is further configured to repeat the traversal, until a quantity of repeating times reaches a first predetermined value, or stop the traversal when a proportion occupied by a word that needs to be reallocated to a topic in all words in all messages published by a user that sends the message is less than a second predetermined value, and obtain current allocation information of each word in the message on the K topics after the last traversal; and a second determining unit configured to determine, if the message is the first message, according to current allocation information of each word in the first message on the K topics, the interest description information of the first message, and further configured to determine, if the message is the second message, according to current allocation information of each word in the second message on the K topics, the topic description information of the second message.

With reference to any one of the first to third possible implementation manners of the second aspect, in a fourth possible implementation manner of the second aspect, the comparison module is specifically configured to use a cosine similarity algorithm:

$$s(u, d) = \frac{\sum_{i=1}^{K} p_i q_i}{\sqrt{\sum_{i=1}^{K} p_i^2} \sqrt{\sum_{i=1}^{K} q_i^2}},$$

where s(u, d) represents the similarity of the interest description information of the first message and the topic description information of the second message; u represents the interest description information of the first message; d represents the topic description information of the second message; $p_i$ represents an $i^{th}$ component of a vector u; and $q_i$ represents an $i^{th}$ component of a vector d.

With reference to any one of the first to third possible implementation manners of the second aspect, in a fifth possible implementation manner of the second aspect, the comparison module is further specifically configured to: use a KL divergence algorithm:

$$KL(u, d) = \sum_{i=1}^{K} p_i \ln \frac{p_i}{q_i},$$

where KL(u, d) represents the similarity of the interest description information of the first message and the topic description information of the second message; u represents the interest description information of the first message; d represents the topic description information of the second message; $p_i$ represents an $i^{th}$ component of a vector u; and $q_i$ represents an $i^{th}$ component of a vector d.

In the present disclosure, a first message published by a first user on a network and a second message published by a second user on the network are separately parsed, interest description information of the first message and topic description information of the second message are obtained, the topic description information is compared with the interest description information, and a similarity of the topic description information and the interest description information is calculated; and if the similarity is greater than or equal to a predetermined value, the second message published by the second user is pushed to the first user, so that a user can conveniently and flexibly obtain a message in which the user is interested.

BRIEF DESCRIPTION OF DRAWINGS

To describe the technical solutions in the embodiments of the present disclosure or in the prior art more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
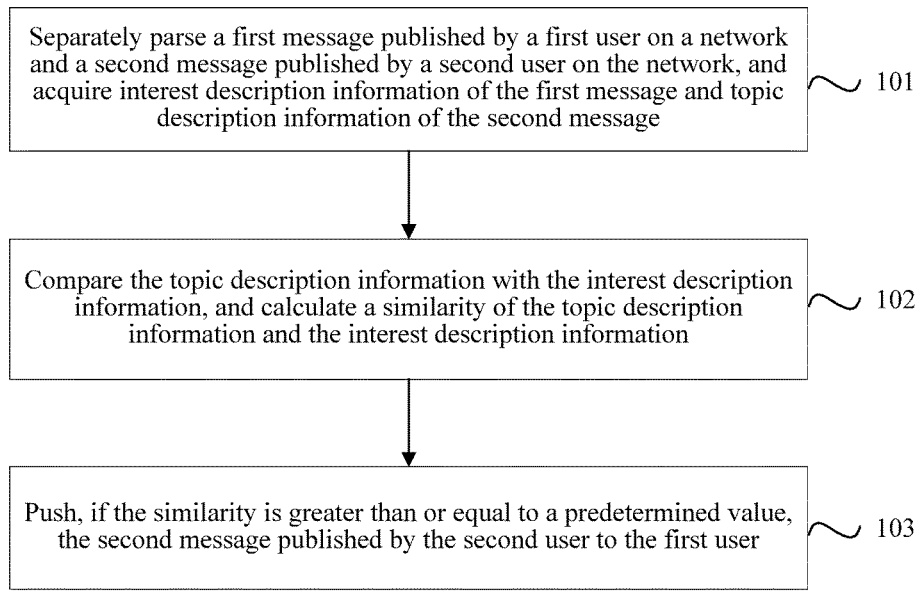
FIG. 1 is a flowchart of Embodiment 1 of a method for recommending a message according to the present disclosure.

FIG. 1 is a flowchart of Embodiment 1 of a method for recommending a message according to the present disclosure. This embodiment may be performed by an apparatus for recommending a message configured in a server, and the apparatus may be implemented by means of software and/or hardware. As shown in FIG. 1, the method in this embodiment may include the following steps.

Step 101: Separately parse a first message published by a first user on a network and a second message published by a second user on the network, and obtain interest description information of the first message and topic description information of the second message.

From a perspective of a statistical model, an interest of a user may be described as a probability distribution on K topics, and each topic may also be a probability distribution on a word. In this embodiment of the present disclosure, in order that a degree of preference of a user for some new microblogs or another network document may be predicted according to a topic preference of the user, so that content that the user wants to view may be automatically recommended, the first message published by the first user on the network needs to be parsed, so as to obtain the interest description information of the first message (the interest description information of the first user), that is, including probability distribution information of the first message published by the first user on the K topics (K is an integer that is greater than 0). The first message may be a message, or may be multiple messages, that is, the first message is a set of messages published by the first user on the network. Moreover, the second message published by the second user on the network needs to be parsed, so as to obtain the topic description information of the second message, that is, including probability distribution information of the second message published by the second user on the K topics (K is an integer that is greater than 0), where the second user is another user except the first user.

Optionally, the first message published by the first user on the network and the second message published by the second user on the network are separately parsed, allocation information of each word in the first message and the second message on the K topics is obtained, and the interest description information of the first message and the topic description information of the second message are separately determined according to the allocation information.

From a perspective of a statistical model, each topic may be a probability distribution on a word. In this embodiment of the present disclosure, the first message published by the first user on the network is parsed, allocation information of each word in the first message on the K topics is obtained, and the interest description information of the first message is determined according to the allocation information. Moreover, the second message published by the second user on the network is parsed, allocation information of each word in the second message on the K topics is obtained, and the topic description information of the second message is determined according to the allocation information.

Optionally, the separately parsing the first message published by the first user on the network and the second message published by the second user on the network, obtaining allocation information of each word in the first message and the second message on the K topics, and separately determining the interest description information of the first message and the topic description information of the second message according to the allocation information includes randomly allocating each word in a message to any one of the K topics, and obtaining allocation information of each word in the message on the K topics after random allocation, where the message includes the first message or the second message; using a Gibbs sampling method, determining, starting from a first word in the message, according to a probability that the word belongs to another topic, whether the word needs to be reallocated to the another topic, further allocating, when a determining result is yes, the word to a topic to which the word needs to be allocated, updating current allocation information of the word on the K topics, until all words in the message are traversed, and updating allocation information of a word that needs to be reallocated in the message on the K topics after the traversal; repeating the traversal, until a quantity of repeating times reaches a first predetermined value, or stopping the traversal when a proportion occupied by a word that needs to be reallocated to a topic in all words in all messages published by a user that sends the message is less than a second predetermined value, and obtaining current allocation information of each word in the message on the K topics after the last traversal; and if the message is the first message, determining, according to current allocation information of each word in the first message on the K topics, the interest description information of the first message; or if the message is the second message, determining, according to current allocation information of each word in the second message on the K topics, the topic description information of the second message.

In this embodiment of the present disclosure, initially, each word in any message m published on a network by any user u of a set quantity of users is randomly allocated to any one of the K topics, where the user u may be the first user or the second user, and correspondingly, the message m may be the first message or the second message, and allocation information of each word in the message on the K topics after random allocation is obtained. Then the Gibbs sampling method may be used, it is determined, starting from a first word in the message m, according to a probability that the word belongs to another topic, whether the word needs to be reallocated to the another topic, when a determining result is yes, the word is further allocated to a topic to which the word needs to be allocated, until all words in the message are traversed, and allocation information of a word that needs to be reallocated in the message on the K topics after the traversal is updated. Therefore, a first round of adjustment is performed for allocation statuses of words, topic allocation statuses of the words after adjustment are more reasonable than initial allocation, for example, initially, a word 1 of the message m is randomly allocated to a topic 2, and when a probability that the word 1 belongs to a topic 5 is greater than a probability that the word 1 belongs to the topic 2, the word is allocated to the topic 5. After the first round of adjustment ends, according to the topic allocation statuses of the words after the first round of adjustment, a second round of adjustment is performed for the allocation statuses of the words, and the allocation statuses of the words after the adjustment are more reasonable than the first round of adjustment. Multiple rounds of adjustment are performed in this way, until a quantity of rounds reaches a first predetermined value, or when a proportion occupied by a word that needs to be reallocated to a topic in each round in all words in all messages published by the user that sends the message m is less than a second predetermined value, it may be considered that the allocation status after multiple times of adjustment is already very reasonable. Therefore, a traversal process stops, and current allocation information of each word in the message on the K topics after the last traversal is obtained. Finally, if the message m is the first message, the interest description information of the first message is determined according to the current allocation information of each word in the first message on the K topics, or if the message m is the second message, the topic description information of the second message is determined according to the current allocation information of each word in the second message on the K topics.

In this embodiment of the present disclosure, an $n^{th}$ word in an $m^{th}$ message (the message m) sent by the user u is marked as $w_{mn}^{u}$, and a sign of a value of the word is marked as w. (For example, a third word in a second message sent by a user 1 is marked as $w_{23}^{1}$, and a value of the word is "Jiuzhai Valley", so that $w_{23}^{1}$=Jiuzhai Valley.) A sign of a topic is marked as z, and a topic allocation status of $w_{mn}^{u}$ is marked as $z_{mn}^{u}$. (For example, an eighth topic is "tourism", the third word in the second message sent by the user 1 is allocated to the topic of "tourism", which is marked as $z_{23}^{1}$=8) A value of a word except $w_{mn}^{u}$ in a data set is marked as $w_{-mn}^{-u}$, and a topic allocation status of $w_{-mn}^{-u}$ is marked as $z_{-mn}^{-u}$.

A probability that each word is allocated to a topic is related to a topic allocation status of another word in the data set. Specifically, a probability that $w_{mn}^{u}$ is allocated to a topic z depends on: a probability that the message m in which $w_{mn}^{u}$ is located is generated by the topic z, and a probability that a value w of $w_{mn}^{u}$ is generated by the topic z.

First, the probability that the message m in which $w_{mn}^{u}$ is located is generated by the topic z is considered, and consideration may be made from two aspects. A first aspect is a topic allocation status of another word except $w_{mn}^{u}$ in the message m. A second aspect is an entire topic allocation status of the user. In the first aspect, $N_{z|m}^{u}$ is used to represent a quantity of times that a word in the message m is allocated to the topic z in all previous rounds of topic allocation. $(N_{z|m}^{u})^{-z_{mn}^{u}}$ is used to represent a quantity of times that all other words except $w_{mn}^{u}$ in the message m is allocated to the topic z in the all previous rounds of topic allocation. In the second aspect, $(N_{z|u})$ is used to represent a quantity of times that a word in a message (regardless of which message it is) published by the user u is allocated to the topic z. $(N_{z|u})^{-z_{mn}^{u}}$ is used to represent a quantity of times that all other words except $w_{mn}^{u}$ in a message (regardless of which message it is) published by the user u is allocated to the topic z in the all previous rounds of topic allocation. Let $N_{\cdot|u}=N_{1|u}+N_{2|u}+\ldots+N_{K|u}$, and $(N_{\cdot|u})^{-z_{mn}^{u}}$ is used to represent a quantity of times that all other words except $w_{mn}^{u}$ in a message (regardless of which message it is) published by the user u is allocated to topics (from a topic 1 to a topic K) in the all previous rounds of topic allocation.

The probability that the message m in which $w_{mn}^{u}$ s located is generated by the topic z may be quantitatively described using $$(N_{z|m}^{u})^{-z_{mn}^{u}} + \lambda^{u} \frac{(N_{z|u})^{-z_{mn}^{u}} + \beta}{(N_{\cdot|u})^{-z_{mn}^{u}} + K\beta},$$

where $\lambda^u$ is used to adjust weights of the first aspect and the second aspect, $\beta$ is a priori value of interest distribution of a user, and both $\lambda^u$ and $\beta$ are adjustable parameters.

Second, a probability that the value w of $w_{mn}^u$ is generated by the topic z is considered. $N_{w|z}$ is used to represent a quantity of times that a word whose value is w in the data set is allocated to the topic z. $(N_{w|z})^{-z_{mn}^u}$ represents a quantity of times that the word whose value is w in the data set is allocated to the topic z in the all previous rounds of topic allocation. $N_{\cdot|z}$ represents a quantity of times that a word (regardless of what value of the word it is) in the data set is allocated to the topic z. $(N_{\cdot|z})^{-z_{mn}^u}$ represents a quantity of times that a word (regardless of what value of the word it is) in the data set is allocated to the topic z in the all previous rounds of topic allocation. W represents a total quantity of words that are not repetitive in the data set, $\gamma$ is a priori value of word distribution in a topic, and $\gamma$ is an adjustable parameter and may be preset.

Therefore, in this embodiment of the present disclosure, specifically, a probability that each word is allocated to or belongs to a topic, for example, a probability that $w_{mn}^u$ is allocated to the topic z may be determined using the following formula:

$$P(z_{mn}^u = z \mid w_{mn}^u = w, w_{-mn}^{-u}, z_{-mn}^{-u}) \qquad (1)$$

$$\propto \left( (N_{z|m}^u)^{-z_{mn}^u} + \lambda^u \frac{(N_{z|u})^{-z_{mn}^u} + \beta}{(N_{\cdot|u})^{-z_{mn}^u} + K\beta} \right) \frac{(N_{w|z})^{-z_{mn}^u} + \gamma}{(N_{\cdot|z})^{-z_{mn}^u} + W\gamma}$$

where $w_{mn}^u$ represents an $n^{th}$ word in an $m^{th}$ message (the message m) sent by the user u; z represents a topic; $z_{mn}^u$ represents a topic allocation status of $w_{mn}^u$; $w_{-mn}^{-u}$ represents a word except $w_{mn}^u$ in the data set; $z_{-mn}^{-u}$ represents a topic allocation status of $w_{-mn}^{-u}$; $N_{z|m}^u$ represents a quantity of times that a word in the message m is allocated to the topic z in the all previous rounds of topic allocation; $(N_{z|m}^u)^{-z_{mn}^u}$ represents a quantity of times that all other words except $w_{mn}^u$ in the message m is allocated to the topic z in the all previous rounds of topic allocation; $(N_{z|u})$ represents a quantity of times that a word in a message (regardless of which message it is) published by the user u is allocated to the topic z; $(N_{z|u})^{-z_{mn}^u}$ represents a quantity of times that all other words except $w_{mn}^u$ in a message (regardless of which message it is) published by the user u is allocated to the topic z in the all previous rounds of topic allocation; $(N_{\cdot|u})^{-z_{mn}^u}$ represents a quantity of times that all other words except $w_{mn}^u$ in a message (regardless of which message it is) published by the user u is allocated to topics (from a topic 1 to a topic K) in the all previous rounds of topic allocation; $(N_{w|u})^{-z_{mn}^u}$ represents a quantity of times that a word whose value is w in the data set is allocated to the topic z in the all previous rounds of topic allocation; $N_{\cdot|z}$ represents a quantity of times that a word (regardless of what value of the word it is) in the data set is allocated to the topic z; $(N_{\cdot|z})^{-z_{mn}^u}$ represents a quantity of times that a word (regardless of what value of the word it is) in the data set is allocated to the topic z in the all previous rounds of topic allocation; W represents a total quantity of words in the data set; $\gamma$ represents a priori value of word distribution in a topic; $\lambda^u$ is used to adjust weights of the first aspect and the second aspect; and $\beta$ represents a priori value of interest distribution of a user.

In this embodiment of the present disclosure, a relative probability that $w_{mn}^u$ is allocated to each topic is given in the formula (1), and it is determined, according to a probability that $w_{mn}^u$ belongs to another topic, whether the word needs to be reallocated to the another topic.

In this embodiment of the present disclosure, each round of topic reallocation may be performed using the Gibbs sampling method, and the Gibbs sampling method may be implemented using the following program:

"for each user u=1, . . . , U for each microblog
m=1, . . . , $M^u$ posted by the user
for each word index n=1, . . . , $N_m^u$ in the microblog $$z_1 \leftarrow z_{mn}^u$$

$$w \leftarrow w_{mn}^u$$

$$N_{z_1|u} \leftarrow N_{z_1|u} - 1$$

$$N_{z_1|m}^u \leftarrow N_{z_1|m}^u - 1$$

$$N_{w|z_1} \leftarrow N_{w|z_1} - 1$$

$$(z_{mn}^u \leftarrow z_2) \propto \left( N_{z_2|m}^u + \lambda^u \frac{N_{z_2|u} + \beta}{N_{\cdot|u} + K\beta} \right) \frac{N_{w|z_2} + \gamma}{N_{\cdot|z_2} + W\gamma}$$

Sampling $$N_{z_2|u} \leftarrow N_{z_2|u} + 1$$

$$N_{z_2|m}^u \leftarrow N_{z_2|m}^u + 1$$

$$N_{w|z_2} \leftarrow N_{w|z_2} + 1"$$

where parameters in the formula $$(z_{mn}^u \leftarrow z_2) \propto \left( N_{z_2|m}^u + \lambda^u \frac{N_{z_2|u} + \beta}{N_{\cdot|u} + K\beta} \right) \frac{N_{w|z_2} + \gamma}{N_{\cdot|z_2} + W\gamma}$$

are the same as those in the foregoing formula (1), and are not described herein again.

Further, in this embodiment of the present disclosure, a quantity of rounds of Gibbs sampling reaches the first predetermined value, or the traversal is stopped when a proportion occupied by a word that needs to be reallocated to a topic in each round in all words in all messages published by the user that sends the message is less than the second predetermined value, and current allocation information (for example $N_{z|u}$, $N_{z|m}^u$, $N_{w|z}$) of each word in the message on the K topics after the last traversal is obtained. If the message is the first message, the interest description information of the first message is determined according to the current allocation information of each word in the first message on the K topics, and reference is made to a formula (4), or if the message is the second message, the topic description information of the second message is determined according to the current allocation information of each word in the second message on the K topics, and reference is made to a formula (5).

In this embodiment of the present disclosure, a $z^{th}$ topic may be represented as probability distribution ($\phi_{z,1}$, $\phi_{z,2}$, . . . , $\phi_{z,W}$) on all words, and each element of the distribution may be:

$$\phi_{z,w} = \frac{N_{w|z} + \gamma}{N_{\cdot|z} + W\gamma} \qquad (3)$$

where $\phi_{z,w}$ represents a $w^{th}$ component of probability distribution of the topic z on the words, where w=1, 2, ..., W, $$N_{\cdot|z} = \sum_w N_{w|z}, \quad (5)$$

and other parameters are the same as the parameters in the foregoing formula (1), and are not described herein again.

Interest description information of the user u may be represented as $(\pi_1^u, \pi_2^u, \ldots, \pi_K^u)$, and each element of the distribution may be:

$$\pi_z^u = \frac{N_{z|u} + \beta}{N_{\cdot|u} + K\beta} \quad (4)$$

where $\pi_z^u$ represents a $z^{th}$ component of probability distribution of interest of the user u on the topic z, where z=1, ..., K, $$N_{\cdot|u} = \sum_z N_{z|u},$$

and other parameters are the same as the parameters in the foregoing formula (1).

Topic description information of a message m of the user u may be represented as $(\theta_{m,1}^u, \theta_{m,2}^u, \ldots, \theta_{m,K}^u)$, and each element of the distribution may be:

$$\theta_{m,z}^u = \frac{N_{z|m}^u + \lambda^u \pi_z^u}{N_{\cdot|z}^u + \lambda^u} \quad (5)$$

where $\theta_{m,z}^u$ represents a $z^{th}$ component of probability distribution of the message m of the user u on the topic z, where z=1, ..., K, $$N_{\cdot|m}^u = \sum_z N_{z|m}^u,$$

and other parameters are the same as the parameters in the foregoing formula (1).

In this embodiment of the present disclosure, probability distribution of any topic on all words, interest description information of any user, and topic description information of any message are respectively obtained through calculation using the foregoing formulas (3), (4), and (5).

Step 102: Compare the topic description information with the interest description information, and calculate a similarity of the topic description information and the interest description information.

Specifically, the probability distribution information of the second message on the K topics is compared with the probability distribution information of the first message on the K topics, and a similarity of the probability distribution information of the second message on the K topics and the probability distribution information of the first message on the K topics is calculated.

In this embodiment of the present disclosure, specifically, a first implementable manner is to use a cosine similarity algorithm:

$$s(u, d) = \frac{\sum_{i=1}^K p_i q_i}{\sqrt{\sum_{i=1}^K p_i^2} \sqrt{\sum_{i=1}^K q_i^2}} \quad (6)$$

where s(u, d) represents the similarity of the interest description information of the first message and the topic description information of the second message; u represents the interest description information of the first message; d represents the topic description information of the second message; $p_u$ represents an $i^{th}$ component of a vector u; and $q_i$ represents an $i^{th}$ component of a vector d.

In this embodiment of the present disclosure, in the formula (5), let $p_i = \pi_i^u$, and $q_i = \theta_{t,i}^v$, where an interest description message (that is, an interest description message of the first message) of the user u and topic description information (that is, a topic description message of the second message) of a message t published by a user v may be respectively calculated using the foregoing formulas (4) and (5). Therefore, the similarity of the probability distribution information of the second message on the K topics and the probability distribution information of the first message on the K topics is calculated using the foregoing formula (6).

Optionally, in this embodiment of the present disclosure, a second implementable manner is to use a KL divergence algorithm:

$$KL(u, d) = \sum_{i=1}^K p_i \ln \frac{p_i}{q_i} \quad (7)$$

where KL(u, d) represents the similarity of the interest description information of the first message and the topic description information of the second message; u represents the interest description information of the first message; d represents the topic description information of the second message; $p_i$ represents an $i^{th}$ component of a vector u; and $q_i$ represents an $i^{th}$ component of a vector d.

In this embodiment of the present disclosure, in the formula (7), let $p_i = \pi_i^u$, and $q_i = \theta_{t,i}^v$, where an interest description message (that is, an interest description message of the first message) of the user u and topic description information (that is, a topic description message of the second message) of a message t published by a user v may be respectively calculated using the foregoing formulas (4) and (5). Therefore, the similarity of the probability distribution information of the second message on the K topics and the probability distribution information of the first message on the K topics is calculated using the foregoing formula (7).

Step 103: Push, if the similarity is greater than or equal to a predetermined value, the second message published by the second user to the first user.

In this embodiment of the present disclosure, a similarity of interest description information of the first user and interest description information of a message t published by the second user may be obtained through calculation using the foregoing formula (6) or (7), and if the similarity is greater than or equal to a predetermined value, it may be considered that the message t published by the second user is a message in which the first user is interested, so that the message is pushed to the first user; otherwise, it is considered that the message t is not a message in which the first user is interested, so that the message is not pushed to the first user. Optionally, the pushing the message to the first user may further include providing a result of the similarity to a social network for pushing a message in which a user is interested to the user.

In this embodiment of the present disclosure, a first message published by a first user on a network and a second message published by a second user on the network are separately parsed, interest description information of the first message and topic description information of the second message are obtained, the topic description information is compared with the interest description information, and a similarity of the topic description information and the interest description information is calculated; and if the similarity is greater than or equal to a predetermined value, the second message published by the second user is pushed to the first user, so that a user can conveniently and flexibly obtain a message in which the user is interested.

Figure 2:
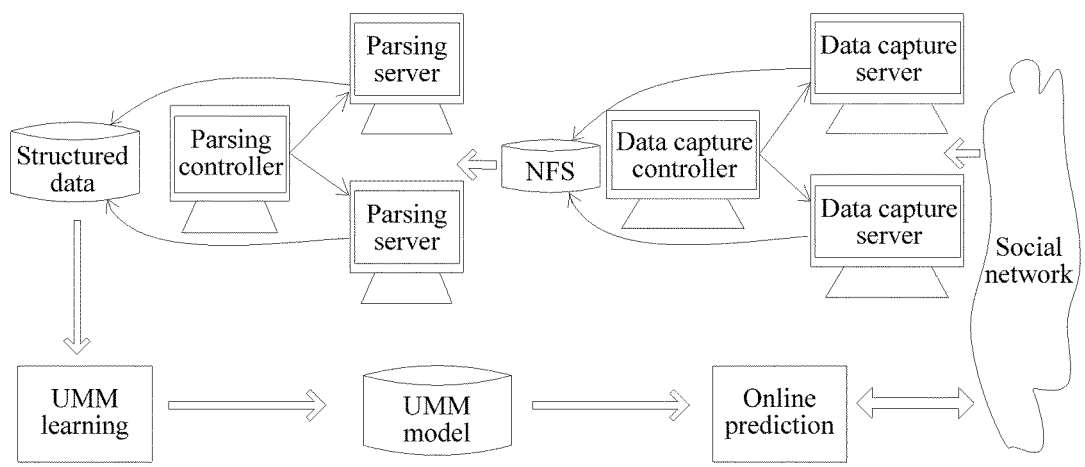
FIG. 2 is a flowchart of Embodiment 2 of a method for recommending a message according to the present disclosure.

FIG. 2 is a flowchart of Embodiment 2 of a method for recommending a message according to the present disclosure. As shown in FIG. 2, first, document data may be fetched from a social network, such as, SINA WEIBO using a data capture server (web crawler) and a data capture controller (crawler scheduling), and stored into a network file system (NFS). Second, the document data fetched by the crawler is parsed into structured data using a data parsing server and a parsing controller, and the structured data is used as input of UMM learning, where a UMM model may be a model established according to the method in step 101 in Embodiment 1 of the method for recommending a message in the present disclosure. Then, according to an author and content (the structured data) of the document, learning is automatically performed using the UMM model to generate a topic, generate a document topic (that is, indication of each document on a topic level, that is, topic description information of a message), and generate a user topic (that is, indication of each user on the topic level, that is, interest description information of the user), which are used as output of the UMM model, that is, the foregoing $\phi_{z,w}$, $\theta_{m,z}^u$, and $\pi_z^u$. At last, when a new generated microblog document is detected on the social network, topic description information of the new document is calculated according to the UMM model, and is compared with interest description information of a user (that is, a similarity calculation), a degree of preference of each user for this new microblog document may be predicted online, and optionally, the degree of preference may be fed back to the social network, so that a microblog that is the most similar to an interest of each user may be selected according to the result, and correspondingly recommended.

Optionally, the method in this embodiment of the present disclosure does not depend on a specific language feature extraction technique, a specific social network environment, or a particular user behavior pattern, and therefore, an application scenario of the present disclosure is not limited to SINA WEIBO, TWITTER, and the like, and may conveniently extend to different social network environments and different content recommendation, which is not limited in this embodiment of the present disclosure.

Figure 3:
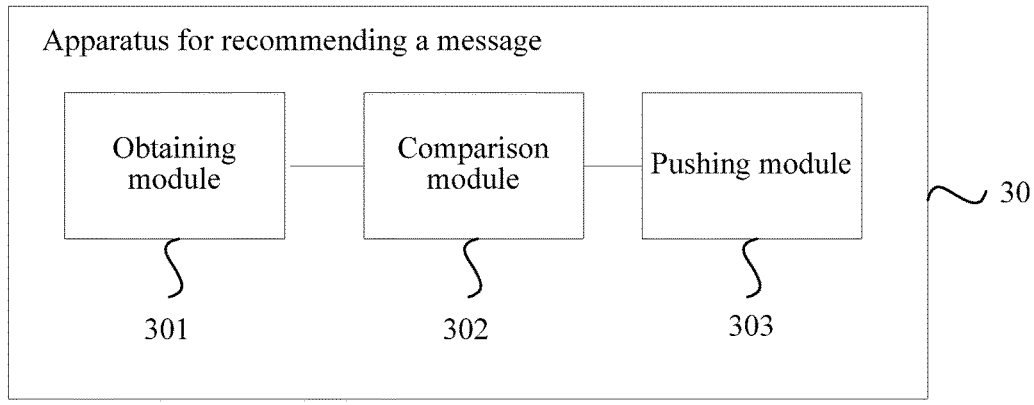
FIG. 3 is a schematic structural diagram of an embodiment of an apparatus for recommending a message according to the present disclosure.

FIG. 3 is a schematic structural diagram of an embodiment of an apparatus for recommending a message according to the present disclosure. As shown in FIG. 3, the apparatus 30 for recommending a message provided in this embodiment includes an obtaining module 301, a comparison module 302, and a pushing module 303, where the obtaining module 301 is configured to separately parse a first message published by a first user on a network and a second message published by a second user on the network, and obtain interest description information of the first message and topic description information of the second message, where the second user is another user except the first user; the comparison module 302 is configured to compare the topic description information with the interest description information, and calculate a similarity of the topic description information and the interest description information; and the pushing module 303 is configured to push, if the similarity is greater than or equal to a predetermined value, a message published by the second user to the first user.

Optionally, the interest description information includes probability distribution information of the first message published by the first user on K topics, and the topic description information includes probability distribution information of the second message published by the second user on the K topics, where K is an integer that is greater than 0; and correspondingly, the comparison module 302 is specifically configured to compare the probability distribution information of the second message on the K topics with the probability distribution information of the first message on the K topics, and calculate a similarity of the probability distribution information of the second message on the K topics and the probability distribution information of the first message on the K topics.

Optionally, the obtaining module 301 is specifically configured to separately parse the first message published by the first user on the network and the second message published by the second user on the network, obtain allocation information of each word in the first message and the second message on the K topics, and separately determine the interest description information of the first message and the topic description information of the second message according to the allocation information.

Optionally, the obtaining module 301 includes an allocation unit configured to randomly allocate each word in a message to any one of the K topics, and obtain allocation information of each word in the message on the K topics after random allocation, where the message includes the first message or the second message; a first determining unit configured to use a Gibbs sampling method, determine, starting from a first word in the message, according to a probability that the word belongs to another topic, whether the word needs to be reallocated to the another topic, further allocate, when a determining result is yes, the word to a topic to which the word needs to be allocated, until all words in the message are traversed, and update allocation information of a word that needs to be reallocated in the message on the K topics after the traversal, where the first determining unit is further configured to repeat the traversal, until a quantity of repeating times reaches a first predetermined value, or stop the traversal when a proportion occupied by a word that needs to be reallocated to a topic in all words in all messages published by a user that sends the message is less than a second predetermined value, and obtain current allocation information of each word in the message on the K topics after the last traversal; and a second determining unit configured to determine, if the message is the first message, according to current allocation information of each word in the first message on the K topics, the interest description information of the first message, and further configured to determine, if the message is the second message, according to current allocation information of each word in the second message on the K topics, the topic description information of the second message.

Optionally, the comparison module 302 is specifically configured to use a cosine similarity algorithm:

$$s(u, d) = \frac{\sum_{i=1}^{K} p_i q_i}{\sqrt{\sum_{i=1}^{K} p_i^2} \sqrt{\sum_{i=1}^{K} q_i^2}},$$

where s(u, d) represents the similarity of the interest description information of the first message and the topic description information of the second message; u represents the interest description information of the first message; d represents the topic description information of the second message; $p_i$ represents an $i^{th}$ component of a vector u; and $q_i$ represents an $i^{th}$ component of a vector d.

Optionally, the comparison module 302 is further specifically configured to use a KL divergence algorithm:

$$KL(u, d) = \sum_{i=1}^{K} p_i \ln \frac{p_i}{q_i},$$

where KL(u, d) represents the similarity of the interest description information of the first message and the topic description information of the second message; u represents the interest description information of the first message; d represents the topic description information of the second message; $p_i$ represents an $i^{th}$ component of a vector u; and $q_i$ represents an $i^{th}$ component of a vector d.

The apparatus for recommending a message in this embodiment may be used for the technical solutions of the foregoing method embodiments for recommending a message. The implementation principles and technical effects are similar, and are not further described herein.

Figure 4:
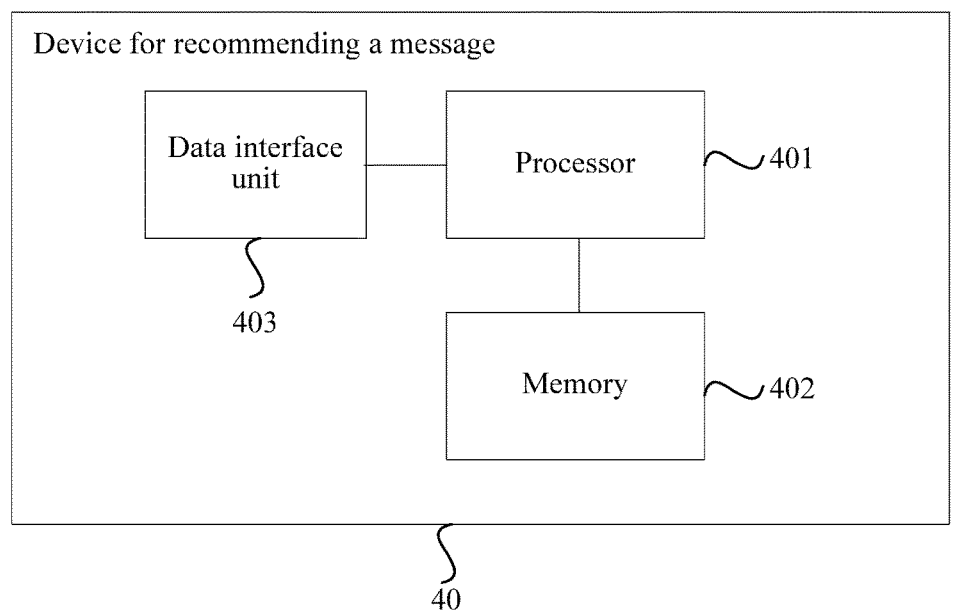
FIG. 4 is a schematic structural diagram of an embodiment of a device for recommending a message according to the present disclosure.

FIG. 4 is a schematic structural diagram of an embodiment of a device for recommending a message according to the present disclosure. As shown in FIG. 4, the device 40 for recommending a message provided in this embodiment includes a processor 401 and a memory 402. The device 40 for recommending a message may further include a data interface unit 403, where the data interface unit 403 may be connected to the processor 401. The data interface unit 403 is configured to receive/send data, and the memory 402 is configured to store an executable instruction. When the device 40 for recommending a message runs, the processor 401 communicates with the memory 402, and the processor 401 invokes the executable instruction in the memory 402, to execute an operation in the embodiment of the foregoing method for recommending a message.

The device for recommending a message in this embodiment may be used to execute the technical solutions of the foregoing method embodiments for recommending a message of the present disclosure. The implementation principles and technical effects are similar, and are not further described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as an read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for recommending a message implemented by a server comprising a processor, wherein the method comprises:

obtaining a first message published by a first user on a network, wherein the first message comprises a plurality of first words;

obtaining a second message published by a second user on the network, wherein the second message comprises a plurality of second words, and wherein the second user is a different user than the first user and is not known to the first user;

separately parsing the first message and the second message;

obtaining, by the processor, interest description information of the first message and topic description information of the second message, wherein the interest description information comprises a first probability distribution information of the first message on K topics, wherein the topic description information comprises a second probability distribution information of the second message on the K topics, wherein K is an integer greater than 0, and wherein obtaining the interest description information and the topic description information comprises:

randomly allocating each of the first words to one of the K topics and each of the second words to one of the K topics;

determining whether each of the first words and each of the second words needs to be reallocated to a different one of the K topics by:

determining, using a Gibbs sampling method starting from an initial word of the first words, whether the initial word of the first words needs to be reallocated to another topic of the K topics according to a value of the other topic's probability of the initial word of the first words, wherein the initial word of the first words is in a first topic comprising a first probability;

determining, using the Gibbs sampling method starting from an initial word of the second words, whether the initial word of the second words needs to be reallocated to another topic of the K topics according to a value of the other topic's probability of the initial word of the second words, wherein the initial word of the second words is in a second topic comprising a second probability;

repeatedly traversing one or more of each of the first words and one or more of each of the second words based on one or more of each of the first words and one or more of each of the second words needing to be reallocated to the different one of the K topics;

stop traversing the first words when a first proportion of one or more of the first words to the total first words needing to be reallocated to one of the K topics is less than a first predetermined value; and
stop traversing the second words when a second proportion of one or more of the second words to the total second words needing to be reallocated to one of the K topics is less than the first predetermined value;
comparing the topic description information with the interest description information comprising comparing the second probability distribution information with the first probability distribution information;
calculating a similarity of the topic description information and the interest description information by calculating a similarity of the second probability distribution information and the first probability distribution information; and
automatically pushing the second message to a first user apparatus associated with the first user when the similarity of the second probability distribution information and the first probability distribution information is greater than or equal to a predetermined value to permit the first user apparatus to view the second message of the second user not known to the first user based on a degree of preference of the first user to online content on the network.

2. The method of claim 1, wherein obtaining interest description information of the first message and topic description information of the second message comprises:
obtaining first allocation information of each of the first words in the first message on the K topics;
obtaining second allocation information of each of the second words in the second message on the K topics; and
separately determining the interest description information of the first message and the topic description information of the second message according to the first and the second allocation information.

3. The method of claim 2, wherein separately parsing the first message and the second message, and obtaining the first and the second allocation information of each of the first words and each of the second words comprises:
obtaining the first allocation information of each of the first words in the first message on the K topics after randomly allocating each of the first words to one of the K topics;
obtaining the second allocation information of each of the second words in the second message on the K topics after randomly allocating each of the second words to one of the K topics and the second words to one of the K topics;
determining, using the Gibbs sampling method on a first word in the first message and according to a probability that the first word belongs to another topic of the K topics, whether the first word needs to be reallocated to the other topic;
determining, using the Gibbs sampling method on a second word in the second message and according to a probability that the second word belongs to another topic of the K topics, whether the second word needs to be reallocated to the other topic;
further allocating the first word to the other topic to which the first word needs to be allocated, until all of the first words in the first message are traversed based on the first word needing to be reallocated to the other topic;
further allocating the second word to the other topic to which the second word needs to be allocated, until all of the second words in the second message are traversed based on the second word needing to be reallocated to the other topic;
updating the first allocation information of the first word after all of the first words are traversed;
updating the second allocation information of the second word after all of the second words are traversed;
repeat traversing the first words and the second words until a quantity of repeating times reaches a second predetermined value;
stop the traversing based on each of the first proportion being less than the first predetermined value and the second proportion being less than the first predetermined value.

4. The method of claim 3, further comprising:
obtaining first current allocation information of each of the first words after stopping the traversing;
obtaining second current allocation information of each of the second words after stopping the traversing; and
determining, according to the first current allocation information of each of the first words in the first message on the K topics, the interest description information of the first message.

5. The method of claim 4, further comprising determining, according to the second current allocation information of each of the second words in the second message on the K topics, the topic description information of the second message.

6. The method of claim 1, wherein comparing the second probability distribution information with the first probability distribution information, and calculating a similarity of the probability distribution information of the second message on the K topics to the probability distribution information of the first message on the K topics using a cosine similarity algorithm according to:

$$s(u, d) = \frac{\sum_{i=1}^{K} p_i q_i}{\sqrt{\sum_{i=1}^{K} p_i^2} \sqrt{\sum_{i=1}^{K} q_i^2}},$$

wherein $s(u, d)$ represents the similarity of the interest description information of the first message and the topic description information of the second message, u represents the interest description information of the first message, d represents the topic description information of the second message, $p_i$ represents an $i^{th}$ component of a vector u, and $q_i$ represents an $i^{th}$ component of a vector d.

7. The method of claim 1, wherein comparing the probability distribution information of the second message on the K topics with the probability distribution information of the first message on the K topics, and calculating a similarity of the probability distribution information of the second message on the K topics and the probability distribution information of the first message on the K topics specifically comprises using a KL divergence algorithm:

$$KL(u, d) = \sum_{i=1}^{K} p_i \ln \frac{p_i}{q_i},$$

wherein KL(u, d) represents the similarity of the interest description information of the first message and the topic description information of the second message, u represents the interest description information of the first message, d represents the topic description information of the second message, $p_i$ represents an $i^{th}$ component of a vector u, and $q_i$ represents an $i^{th}$ component of a vector d.

8. An apparatus for recommending a message, comprising:
  a memory comprising instructions;
  a processor coupled to the memory and configured to execute the instructions, wherein the instructions cause the apparatus to:
    obtain a first message published by a first user on a network, wherein the first message comprises a plurality of first words;
    obtain a second message published by a second user on the network, wherein the second message comprises a plurality of second words, and wherein the second user is a different user than the first user and is not known to the first user;
    separately parse the first message and the second message;
    obtain interest description information of the first message and topic description information of the second message, wherein the interest description information comprises a first probability distribution information of the first message on K topics, wherein the topic description information comprises a second probability distribution information of the second message on the K topics, wherein K is an integer greater than 0, and wherein obtaining the interest description information and the topic description information comprises:
      randomly allocate each of the first words to one of the K topics and each of the second words to one of the K topics;
      determine whether each of the first words and each of the second words needs to be reallocated to a different one of the K topics by:
        determining, using a Gibbs sampling method starting from an initial word of the first words, whether the initial word of the first words needs to be reallocated to another topic of the K topics according to a value of the other topic's probability of the first word, wherein the initial word of the first words is in a first topic comprising a first probability; and
        determining, using the Gibbs sampling method starting from an initial word of the second words, whether the initial word of the second words needs to be reallocated to another topic of the K topics according to a value of the other topic's probability of the second word, wherein the initial word of the second words is in a second topic comprising a second probability;
      repeatedly traversing one or more of each of the first words and one or more of each of the second words based on one or more of each of the first words and one or more of each of the second words needing to be reallocated to the different one of the K topics;
      stop traversing the first words when a first proportion of one or more of the first words needing to be reallocated to one of the K topics is less than a first predetermined value; and
      stop traversing the second words when a second proportion of one or more of the second words needing to be reallocated to one of the K topics is less than the first predetermined value;
    compare the topic description information with the interest description information comprising comparing the second probability distribution information with the first probability distribution information;
    calculate a similarity of the topic description information and the interest description information comprising calculating a similarity of the second probability distribution information and the first probability distribution information; and
    automatically push the second message to a first user apparatus associated with the first user when the similarity of the second probability distribution information and the first probability distribution information is greater than or equal to a predetermined value to permit the first user apparatus to view the second message of the second user not known to the first user based on a degree of preference of the first user to online content on the network.

9. The apparatus of claim 8, wherein the instructions further cause the processor to:
  obtain first allocation information of each of the first words in the first message on the K topics;
  obtain second allocation information of each of the second words in the second message on the K topics; and
  separately determine the interest description information of the first message and the topic description information of the second message according to the first and the second allocation information.

10. The apparatus of claim 9, wherein the instructions further cause the processor to:
  obtain the first allocation information of each of the first words in the first message on the K topics after the random allocation of each of the first words to one of the K topics;
  obtain the second allocation information of each of the second words in the second message on the K topics after random allocation of each of the second words to one of the K topics and the second words to one of the K topics;
  determine, using the Gibbs sampling method on a first word in the first message and according to a probability that the first word belongs to another topic of the K topics, whether the first word needs to be reallocated to the other topic;
  determine, using the Gibbs sampling method on a second word in the second message and according to a probability that the second word belongs to another topic of the K topics, whether the second word needs to be reallocated to the other topic;
  further allocate the first word to the other topic to which the first word needs to be allocated until all of the first words in the first message are traversed based on the first word needing to be reallocated to the other topic;
  further allocate the second word to the other topic to which the second word needs to be allocated, until all of the second words in the second message are traversed based on the second word needing to be reallocated to the other topic;
  update the first allocation information of the first word after all of the first words are traversed;
  update the second allocation information of the second word after all of the second words are traversed;

repeat the traversal of the first words and the second words until a quantity of repeating times reaches a second predetermined value; and stop the traversal when each of the first proportion is less than the first predetermined value and the second proportion is less than the first predetermined value.

11. The apparatus of claim 10, wherein the instructions further cause the processor to:

obtain first current allocation information of each of the first words after stopping the traversal;

obtain second current allocation information of each of the second words after stopping the traversal; and determine, according to the first current allocation information of each of the first words in the first message on the K topics, the interest description information of the first message.

12. The apparatus of claim 11, wherein the instructions further cause the processor to determine, according to the second current allocation information of each of the second words in the second message on the K topics, the topic description information of the second message.

13. The apparatus of claim 8, wherein the instructions further cause the processor to use a cosine similarity algorithm:

$$s(u, d) = \frac{\sum_{i=1}^{K} p_i q_i}{\sqrt{\sum_{i=1}^{K} p_i^2} \sqrt{\sum_{i=1}^{K} q_i^2}},$$

and wherein s(u, d) represents the similarity of the interest description information of the first message and the topic description information of the second message, u represents the interest description information of the first message, d represents the topic description information of the second message, $p_i$ represents an $i^{th}$ component of a vector u, and $q_i$ represents an $i^{th}$ component of a vector d.

14. The apparatus of claim 8, wherein the instructions further cause the processor to use a KL divergence algorithm:

$$KL(u, d) = \sum_{i=1}^{K} p_i \ln \frac{p_i}{q_i},$$

and wherein KL(u, d) represents the similarity of the interest description information of the first message and the topic description information of the second message, u represents the interest description information of the first message, d represents the topic description information of the second message, $p_i$ represents an $i^{th}$ component of a vector u, and $q_i$ represents an $i^{th}$ component of a vector d.

15. A computer program product comprising computer-executable instructions stored on a non-transitory computer-readable medium that, when executed by a processor, cause an apparatus to:

obtain a first message published by a first user on a network, wherein the first message comprises a plurality of first words;

obtain a second message published by a second user on the network, wherein the second message comprises a plurality of second words, wherein the second user is a different user than the first user and is not known to the first user;

separately parse the first message and the second message;

obtain interest description information of the first message and topic description information of the second message, wherein the interest description information comprises a first probability distribution information of the first message on K topics, wherein the topic description information comprises a second probability distribution information of the second message on the K topics, and wherein K is an integer is greater than 0, and wherein obtaining the interest description information and the topic description information comprises:

randomly allocate each of the first words to one of the K topics and each of the second words to one of the K topics;

determine whether each of the first words and each of the second words needs to be reallocated to a different one of the K topics by:

determining, using a Gibbs sampling method starting from an initial word of the first words, whether the initial word of the first words needs to be reallocated to another topic of the K topics according to a value of the other topic's probability of the initial word of the first words, wherein the initial word of the first words is in a first topic comprising a first probability;

determining, using the Gibbs sampling method starting from an initial word of the second words, whether the initial word of the second words needs to be reallocated to another topic of the K topics according to a value of the other topic's probability of the initial word of the second words, wherein the initial word of the second words is in a second topic comprising a second probability;

repeatedly traversing one or more of each of the first words and one or more of each of the second words based on one or more of each of the first words and one or more of each of the second words needing to be reallocated to the different one of the K topics;

stop traversing the first words when a first proportion of one or more of the first words needing to be reallocated to one of the K topics is less than a first predetermined value; and stop traversing the second words when a second proportion of one or more of the second words needing to be reallocated to one of the K topics is less than the first predetermined value;

compare the topic description information with the interest description information comprising comparing the second probability distribution information with the first probability distribution information;

calculate a similarity of the topic description information and the interest description information comprising calculating a similarity of the second probability distribution information and the first probability distribution information; and automatically push the second message to a first user apparatus associated with the first user when the similarity of the second probability distribution information and the first probability distribution information is greater than or equal to a predetermined value to permit the first user apparatus to view the second message of the second user not known to the first user based on a degree of preference of the first user to online content on the network.

16. The computer program product of claim 15, wherein the instructions further cause the apparatus to be configured to:
obtain first allocation information of each of the first words in the first message on the K topics;
obtain second allocation information of each of the second words in the second message on the K topics; and
separately determine the interest description information of the first message and the topic description information of the second message according to the first and the second allocation information.

17. The computer program product of claim 16, wherein the computer-executable instructions further cause the apparatus to be configured to:
obtain the first allocation information of each of the first words in the first message on the K topics after the random allocation of each of the first words to one of the K topics;
obtain the second allocation information of each of the second words in the second message on the K topics after random allocation of each of the second words to one of the K topics and the second words to one of the K topics;
determine, using the Gibbs sampling method on the first word in the first message and according to a probability that the first word belongs to another topic of the K topics, whether the first word needs to be reallocated to the other topic;
determine, using the Gibbs sampling method on the second word in the second message and according to a probability that the second word belongs to another topic of the K topics, whether the second word needs to be reallocated to the other topic;
further allocate the first word to the other topic to which the first word needs to be allocated until all of the first words in the first message are traversed based on the first word needing to be reallocated to the other topic;
further allocate the second word to the other topic to which the second word needs to be allocated, until all of the second words in the second message are traversed based on the second word needing to be reallocated to the other topic;
update the first allocation information of the first word after all of the first words are traversed;
update the second allocation information of the second word after all of the second words are traversed;
repeat the traversal of the first words and the second words until a quantity of repeating times reaches a second predetermined value; and
stop the traversal when each of the first proportion is less than the first predetermined value and the second proportion is less than the first predetermined value.

18. The computer program product of claim 17, wherein the computer-executable instructions further cause the apparatus to be configured to:
obtain first current allocation information of each of the first words after stopping of the traversal;
obtain second current allocation information of each of the second words after stopping the traversing;
determine, according to the first current allocation information of each of the first words in the first message on the K topics, the interest description information of the first message; and
determine, according to the second current allocation information of each of the second words in the second message on the K topics, the topic description information of the second message.

19. The computer program product of claim 15, wherein the computer-executable instructions further cause the apparatus to compare the second probability distribution information with the first probability distribution information, and calculate a similarity of the probability distribution information of the second message on the K topics to the probability distribution information of the first message on the K topics using a cosine similarity algorithm according to:

$$s(u, d) = \frac{\sum_{i=1}^{K} p_i q_i}{\sqrt{\sum_{i=1}^{K} p_i^2} \sqrt{\sum_{i=1}^{K} q_i^2}},$$

wherein s(u, d) represents the similarity of the interest description information of the first message and the topic description information of the second message, u represents the interest description information of the first message, d represents the topic description information of the second message, $p_i$ represents an $i^{th}$ component of a vector u, and $q_i$ represents an $i^{th}$ component of a vector d.

20. The computer program product of claim 15, wherein the computer-executable instructions further cause the apparatus to compare the probability distribution information of the second message on the K topics with the probability distribution information of the first message on the K topics, and calculate a similarity of the probability distribution information of the second message on the K topics and the probability distribution information of the first message on the K topics using a KL divergence algorithm according to:

$$KL(u, d) = \sum_{i=1}^{K} p_i \ln \frac{p_i}{q_i},$$

wherein KL(u, d) represents the similarity of the interest description information of the first message and the topic description information of the second message, u represents the interest description information of the first message, d represents the topic description information of the second message, $p_i$ represents an $i^{th}$ component of a vector u, and $q_i$ represents an $i^{th}$ component of a vector d.

* * * * *